Nov. 28, 1967 S. BERKOWITZ ET AL 3,355,486
CONTINUOUS PROCESS OF SYNTHESIZING AMINO-IMINOMETHANE-SULFINIC ACID
Filed Jan. 8, 1965
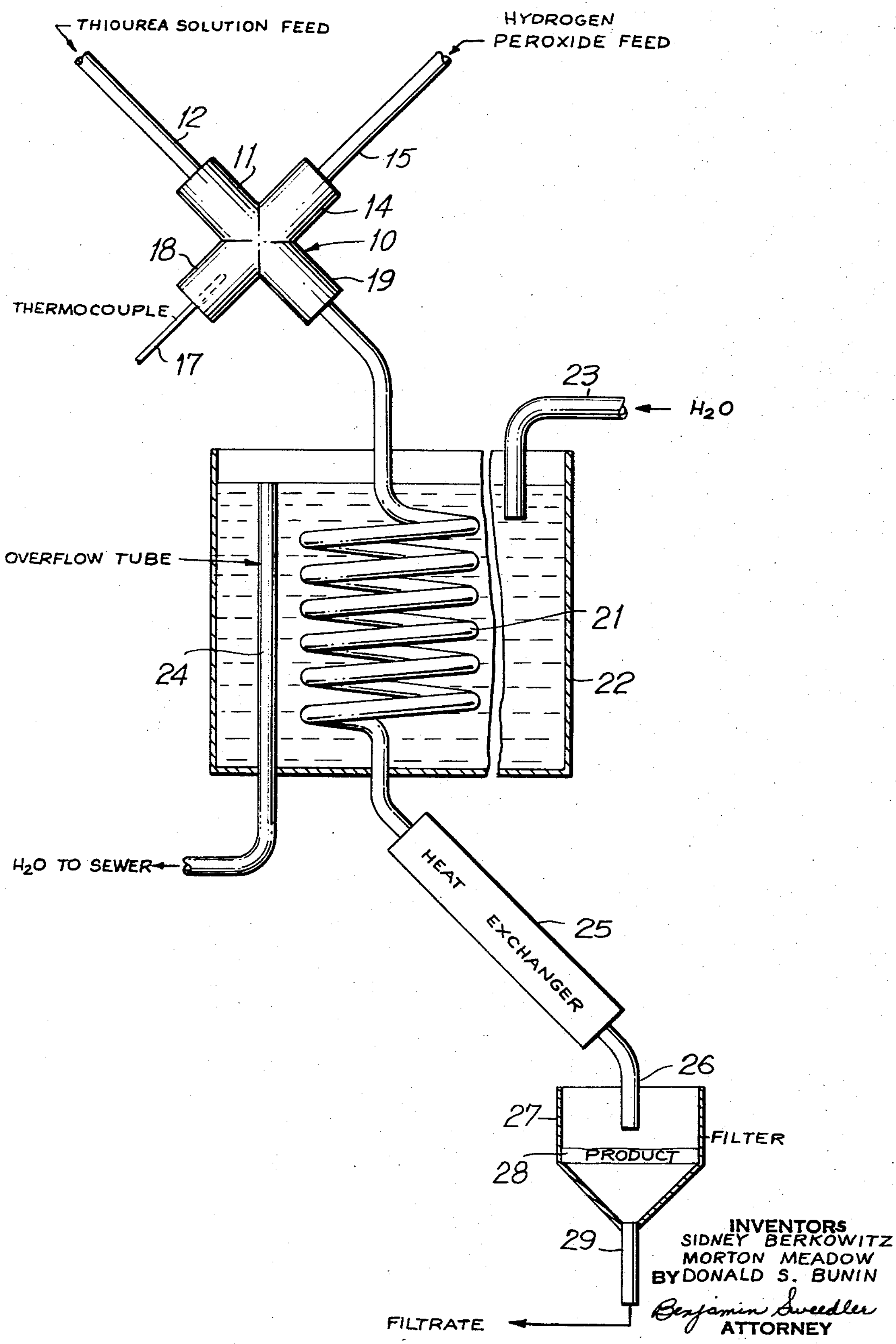
INVENTORS
SIDNEY BERKOWITZ
MORTON MEADOW
BY DONALD S. BUNIN
Benjamin Sweedler
ATTORNEY United States Patent Office 3,355,486
Patented Nov. 28, 1967

3,355,486

CONTINUOUS PROCESS OF SYNTHESIZING AMINO-IMINOMETHANE-SULFINIC ACID

Sidney Berkowitz, Highland Park, Morton Meadow, Trenton, and Donald S. Bunin, Metuchen, N.J., assignors to FMC Corporation, New York, N.Y., a corporation of Delaware Filed Jan. 8, 1965, Ser. No. 424,325
5 Claims. (Cl. 260—513.7)

This invention relates to the synthesis of aminoiminomethane-sulfinic acid, also referred to as thiourea dioxide, which will be referred to herein, for the sake of brevity, as TDO. More particularly, this invention relates to a continuous process of synthesizing TDO.

In this specification all percentages are given on a weight basis.

TDO is useful as a reducing agent; it reduces vat dyes, ketones to alcohols and hydrocarbons and conjugated unsaturated acids to the corresponding saturated acids. It is an excellent antioxidant in the stabilization of perchloroethylene. It is useful in organic synthesis in the preparation of pharmaceuticals and other chemicals.

The reaction of hydrogen peroxide with thiourea or equilibrium mixtures of ammonium thiocyanate and thiourea to produce TDO is disclosed, for example, in United States Patents 2,150,921 granted Mar. 21, 1939; 2,347,446 granted Apr. 25, 1944; and 2,783,272 granted Feb. 26, 1957. The reaction is an exothermic reaction with liberation of large quantities of heat, about 103K cal. per mol; it proceeds instantaneously with the formation of by-products which reduce the yield and contaminate the product. This may explain why procedures known prior to this invention employed batch techniques with slow addition of the reactants to the reaction mixture, in an effort to minimize the formation of undesired by-products. For example, in the process disclosed in United States Patent 2,783,272, 30 parts of a 50% hydrogen peroxide solution is added at a rate of 1.2 parts per minute to an agitated solution of 20 parts of thiourea in 300 parts of water maintained at 2° C. to 5° C., to produce a slurry of TDO crystals, and to this slurry was added 120 parts of solid thiourea and 222 parts of 50% hydrogen peroxide solution separately. The hydrogen peroxide was added at a rate of about 1.2 parts per minute. The thiourea was added in small increments over the same time period as required for the addition of the hydrogen peroxide at a rate to maintain the slurry at a pH of 3 to 5 and to maintain a concentration of unreacted thiourea in the liquid phase of the slurry within the range of 0.5% to 1.0% during substantially the entire reaction period. Thus the residence time of the reactants and reaction mixture within the reactor in this process was about 6.5 hours; the time required for the formation of the initial slurry of TDO was 25 minutes; the time required for the separate addition of the 222 parts of hydrogen peroxide solution and the 120 parts of thiourea to this slurry was 185 minutes each, making a total of 395 minutes.

The relatively long residence times for the reactants and reaction mixtures in contact with each other involved in batch procedures, results in the formation of undesired by-products which contaminate the TDO and reduce the yield of TDO and this notwithstanding the slow addition of the reactants to the reaction mixture. Such long residence times, for example, permit hydrogen peroxide to react with the TDO in the reaction mixture to produce undesired oxidation products. Furthermore, for production on a commercial scale such batch procedures require large and costly equipment for accommodating large volumes of solution and occupying considerable floor area.

It is a principal object of the present invention to provide a continuous process of producing TDO, which results in high yields of good purity product and can be carried out in relatively simple, compact equipment.

Other objects and advantages of the present invention will be apparent from the following detailed description thereof.

In accordance with this invention, a stream containing thiourea, either aqueous thiourea or an equilibrium mixture of thiourea and ammonium thiocyanate, the stream having a concentration of from about 0.7% to about 10% of the thiourea, and a stream of aqueous hydrogen peroxide solution containing hydrogen peroxide in amount to produce upon admixture with the aqueous thiourea containing stream, a mixture containing from about 1.5% to 12% hydrogen peroxide, preferably about 6% hydrogen peroxide, are supplied continuously to a reactor, where the reactants are intimately mixed and reacted at a temperature of from about 5° C. to about 80° C., preferably about 5° C. to about 15° C. and at a pH of from about 3 to 7. At these temperatures and pH conditions the reaction proceeds readily and rapidly and without excessive formation of by-products. The reaction mixture is withdrawn continuously and immediately cooled to a temperature of about 0° C. The rates of flow of the reactants into the reactor and that of the reaction mixture withdrawn therefrom are controlled to provide a residence time within the reactor of from about 0.1 second to about 10 minutes, desirably not more than about 7 minutes. The preferred residence time is about one minute.

Cooling of the reaction product immediately after leaving the reactor quenches the reaction mixture which is at a higher temperature than the reactor and thus tends to minimize formation of by-products. The reaction mixture can be cooled to about 0° C. to reduce the solubility of the product to a minimum before recovering the TDO crystals from the reaction slurry. Such cooling can be effected when the reaction mixture is quenched or the reaction mixture can first be cooled by cooling water to a temperature of about 20° C. and thereafter with ice water to a temperature of about 0° C.

The desired temperature of from about 5° to about 80° C. can be maintained in the reactor by controlling the rate of feed of the two reactant streams and, if necessary, by cooling the reactor.

The hydrogen peroxide and thiourea are reacted in approximately stoichiometric proportions, i.e., two mols of hydrogen peroxide per mol of thiourea. Desirably a small excess, say about 5% of thiourea over and above the stoichiometric amount is used. Thiourea of commerce or the reaction mixture produced by heating ammonium thiocyanate to produce an equilibrium mixture containing 75% ammonium thiocyanate and 25% thiourea can be used as the thiourea reactant. In either case whether thiourea, as such, or the equilibrium mixture of ammonium thiocyanate and thiourea is employed, the thiourea reactant is dissolved in water to produce the aqueous solution containing from about 0.7% to about 10% of thiourea, which solution is fed continuously into the reactor.

Hydrogen peroxide of commerce, in any available concentration, can be used. Desirably 50% hydrogen peroxide concentration in water is used as the feed stream. The flow rate of the hydrogen peroxide stream is controlled to produce a reaction mixture in the reactor containing from about 1.5% to about 12% hydrogen peroxide, preferably about 6% hydrogen peroxide.

The pH within the range of about 3 to 7 is critical. Operating at a pH above 7, i.e., under basic conditions, tends to favor reaction of TDO with itself or with hydrogen peroxide, both of which reactions are wasteful of the desired product. If acid is added to the reaction mixture, peracids form which react with the TDO, reducing the yield of the desired product. For example, peracetic acid is formed when acetic acid is added to the reaction mixture and peroxymonosulfuric acid when sulfuric acid is added to the reaction mixture, both of which peracids react with the TDO to reduce the yield of desired reaction product. By feeding continuously streams of hydrogen peroxide and aqueous solutions of thiourea or thiourea and ammonium thiocyanate, at the controlled rates indicated, gives pH conditions of from 5 to 6 in the reaction mixture flowing through the reactor.

The reactants are mixed intimately and thoroughly in the reactor. Use of a coil or pipe causes the reactants to mix intimately, thus promoting the reaction without objectionable formation of by-products.

In reactors not of the pipe type, in which the cross-sectional area of the reactor is relatively large as compared with the inside diameter of the pipe or pipes of pipe reactors, the reactor is provided with a suitable mixer or agitator to obtain intimate mixing of the reactants and reaction mixture during their flow through the reactor.

The reactor as well as the remaining equipment desirably is of aluminum because aluminum has good thermal conductivity and is compatible with the reactants and the reaction mixture in that aluminum will not react with them or cause them to decompose. Instead of aluminum, stainless steel or other suitable construction material compatible with the reaction system can be employed.

The accompanying drawing is a flow sheet showing schematically one form of reactor and associated equipment for use in practicing the process of this invention.

In the drawing the reactor 10 is in the form of a cross of suitable construction material, such as aluminum. Leg 11 of the reactor is provided with a thiourea solution feed line 12 communicating with a metering pump (not shown) for controlling the flow of the thiourea solution stream supplied by this line to the reactor 10. Leg 14 of reactor 10 has leading thereinto a hydrogen peroxide feed line 15 communicating with a metering pump (not shown) for controlling the feed of the hydrogen peroxide to reactor 10. Thermocouple 17 is positioned in leg 18 to measure the temperature in the reactor 10. The fourth leg 19, which is the discharge conduit for the reaction mixture communicates with a coil 21, the main body of which is immersed in the cooling liquid in vessel 22 fragmentarily shown in the drawing. This vessel can be supplied with cooling water or other suitable cooling medium; water is indicated for illustrative purposes on the drawing. Cold water is supplied through line 23 to maintain a constant level of cooling water in tank 22, the level of which is controlled by the overflow tube 24 which leads to the sewer or other suitable disposal point.

Cooling coil 21 communicates with a heat exchanger 25 where further cooling of the reaction mixture is effected employing a suitable cooling medium such, for example, as ice water. Heat exchanger 25 effects cooling of the reaction mixture to a temperature of about 0° C. From heat exchanger 25 the cooled slurry is discharged through exit line 26 into a filter 27. In this filter, product TDO crystals 28 are separated from the filtrate which is discharged through line 29. When employing an equilibrium mixture of thiourea and ammonium thiocyanate, the latter remains in solution in the filtrate; it can be recovered by evaporating the solution and heated to produce equilibrium mixture for further processing.

The following examples are given to illustrate the preferred practice of the process of this invention, without, however, limiting the invention to these illustrative examples.

*Example I*

This example was carried out in the equipment of the type shown in the drawing using an aluminum pipe cross reactor as shown each leg of which had an I.D. of 0.35 inch. 338 ml. of hydrogen peroxide of 50% concentration and 2420 ml. of an aqueous solution of thiourea containing 10% thiourea were pumped continuously into the respective legs 14 and 11 of the cross at a rate of 40 ml./min. thiourea and 5.7 ml./min. hydrogen peroxide for one hour. The reaction mixture was withdrawn from the leg 19 of the cross at a rate of 45.7 ml. per minute and passed through the circulating water bath in tank 22 maintained at a temperature of 20° C. The residence time in the reaction cross was about 30 seconds. The temperature of the reaction mixture in the cross was from 8° C. to 10° C. From the cooling coil 21 the reaction mixture was passed into the heat exchanger 25 where it was cooled with ice water to a temperature of about 0° C. The TDO crystals were removed by filtering the resultant slurry.

The weight of the product obtained (318 grams) based on the weight of the hydrogen peroxide charged, was approximately theoretical. The product was of good purity.

*Examples II, III and IV*

In the next three examples the residence time maintained in each case was about seven minutes. These examples each involved the continuous feed of aqueous solutions of reactants at the rates indicated in the table which follows. Examples II and III were of one hour duration. Example IV of 1½ hours duration. In all examples substantially stoichiometric amounts of thiourea and hydrogen peroxide were introduced into the reactor which was a cylindrical housing equipped with an agitator into which the reactant streams were introduced at the rates indicated and the reaction mixture continuously withdrawn therefrom. The hydrogen peroxide used was of 50% concentration; the amounts added gave a reaction mixture containing about 6% hydrogen peroxide.

TABLE

| Ex. No. | Thiourea Flow Rate, ml./min. | Vol. Thiourea Added, ml. | Mols Thiourea Added | $H_2O_2$ Flow Rate, ml./min. | Vol. $H_2O_2$ Added, ml. | Mols $H_2O_2$ Added | pH of Reaction Mixture | Yield of TDO |
|---|---|---|---|---|---|---|---|---|
| II | 40 | 2,420 | 4.1 | 5.7 | 338 | 5.9 | 5.0 | 93 |
| III | 40 | 2,420 | 4.1 | 5.7 | 338 | 5.0 | 5.0 | 90 |
| IV | 40 | 3,610 | 6.15 | 5.7 | 436 | 5.5 | 5.5 | 90 |

It will be noted that the present invention provides a continuous process for producing TDO in simple and compact equipment. The need for the large equipment required for batch operations on a commercial scale is eliminated. In the continuous process of this invention undesirable side reactions are reduced to a minimum and the TDO product obtained is chemically pure and shows excellent storage stability.

Since certain changes in carrying out the above continuous process, which embodies the invention, can be made without departing from its scope, it is intended that all matter contained in the above description or shown in the accompanying drawing shall be interpreted as illustrative and not in a limiting sense.

What is claimed is:

1. The continuous process of synthesizing amino-imino-methane-sulfinic acid, which comprises continuously feeding an aqueous solution of thiourea containing from 0.7% to 10% by weight of thiourea to a reaction zone, concurrently continuously feeding an aqueous solution of hydrogen peroxide into said reaction zone and producing an intimate mixture of these reactants, the amount of hydrogen peroxide thus introduced being such as to produce a reaction mixture containing from 1.5% to 12% by weight of hydrogen peroxide, continuously withdrawing reaction mixture from said reaction zone, maintaining the reaction zone at a temperature within the range of from 5° C. to 80° C., controlling the rate of flow of said aqueous solution of thiourea and said stream of hydrogen peroxide and the rate of withdrawal of the reaction mixture from said reaction zone so that the residence time of the reactants and the reaction product in said reaction zone is within the range of from 0.1 second to 10 minutes and the pH of the reaction mixture is from 5 to 7, cooling the reaction mixture immediately upon withdrawal from the reaction zone thus forming a slurry of amino-iminomethane-sulfinic acid crystals, and continuously separating the amino-iminomethane-sulfinic acid crystals from the slurry.

2. The continuous process as defined in claim 1, in which the aqueous solution containing thiourea is a solution of an equilibrium mixture of thiourea and ammonium thiocyanate.

3. The continuous process as defined in claim 1, in which the temperature in the reaction zone is maintained within the range of from 5° C. to 15° C.

4. The continuous process as defined in claim 1, in which the temperature in the reaction zone is maintained within the range of from 5° C. to 15° C., and the reaction mixture is cooled to a temperature of about 0° C. immediately after it is removed from the reaction zone.

5. The continuous process as defined in claim 1, in which the thiourea solution stream contains about 10% by weight of thiourea and the hydrogen peroxide stream fed to the reactor contains about 50% by weight of hydrogen peroxide.

References Cited

UNITED STATES PATENTS

| | | | |
|---|---|---|---|
| 2,150,921 | 3/1939 | Havas | 260—500 |
| 2,347,446 | 4/1944 | Walker | 260—500 |
| 2,783,272 | 2/1957 | Young | 260—500 |

LEON ZITVER, *Primary Examiner.*

J. E. EVANS, *Assistant Examiner.*